US009395180B2

(12) United States Patent
Schajer (10) Patent No.: US 9,395,180 B2
(45) Date of Patent: Jul. 19, 2016

(54) MEASUREMENT OF THE SURFACE SHAPE MAP OF FLAT AND CURVY OBJECTS, INDEPENDENT OF RELATIVE MOTIONS

(75) Inventor: Gary Stephen Schajer, Vancouver (CA)

(73) Assignee: FPINNOVATIONS, St-Jean, Pointe-Claire, Quebec (CA)

( * ) Notice: Subject to any disclaimer, the term of this patent is extended or adjusted under 35 U.S.C. 154(b) by 843 days.

(21) Appl. No.: 13/576,287

(22) PCT Filed: Feb. 7, 2011

(86) PCT No.: PCT/CA2011/000153
§ 371 (c)(1),
(2), (4) Date: Sep. 25, 2012

(87) PCT Pub. No.: WO2011/094860
PCT Pub. Date: Aug. 11, 2011

(65) Prior Publication Data
US 2013/0054193 A1    Feb. 28, 2013

Related U.S. Application Data (60) Provisional application No. 61/302,275, filed on Feb. 8, 2010.

(51) Int. Cl.
*G01B 21/20* (2006.01)
(52) U.S. Cl.
CPC ...................... *G01B 21/20* (2013.01)
(58) Field of Classification Search
CPC ....................................... G01P 3/489
USPC ......................................... 702/167
See application file for complete search history.

(56) References Cited

U.S. PATENT DOCUMENTS

| 4,573,131 | A |   | 2/1986 | Corbin |
| 4,601,053 | A | * | 7/1986 | Grumet ............ 382/106 |

(Continued)

FOREIGN PATENT DOCUMENTS

| CA | 2297879 |   | 8/2001 |   |
| WO | WO2007017782 | * | 2/2007 | ......... G06F 3/042 |

OTHER PUBLICATIONS

International Search Report of PCT/CA2011/000153.

*Primary Examiner* — Manuel L Barbee
*Assistant Examiner* — Raymond Nimox
(74) *Attorney, Agent, or Firm* — Norton Rose Fulbright Canada LLP (57) ABSTRACT

A plurality of distance sensors are used to measure the surface shape map of objects in the presence of relative motions between the object and sensor in the measurement directions of the sensors. The method involves making multiple sequential measurements from a group of sensors while the object moves longitudinally relative to the sensors. The central idea of the invention is the observation that surface shape features appear in delayed sequence as the observed surface moves longitudinally relative to the sensor array, while any relative motions in the measurement directions appear simultaneously at all sensors. Mathematical procedures are used to identify the relative motions from within the measurements. These motions are then subtracted from the sensor reading to determine the surface shape map of the measured object. The invention can be applied to many different measurement types, including surface shape measurement of one- or multiple-sided generally flat objects, and surface shape measurement of more general three-dimensional objects.

11 Claims, 7 Drawing Sheets

(56) References Cited

U.S. PATENT DOCUMENTS

| | | | |
|---|---|---|---|
| 5,280,719 A | 1/1994 | Noss | |
| 5,337,289 A * | 8/1994 | Fasching et al. | 367/140 |
| 5,345,309 A | 9/1994 | Wertz et al. | |
| 5,612,905 A * | 3/1997 | Maillart et al. | 702/153 |
| 5,735,055 A | 4/1998 | Hochbein et al. | |
| 6,542,249 B1 * | 4/2003 | Kofman et al. | 356/601 |
| 6,974,964 B1 * | 12/2005 | Wang | 250/559.29 |
| 7,003,894 B2 * | 2/2006 | Schajer et al. | 33/552 |
| 7,336,373 B2 * | 2/2008 | Eriguchi et al. | 356/601 |
| 8,218,153 B2 * | 7/2012 | Kostka | G01B 11/25 356/603 |
| 2005/0204572 A1 * | 9/2005 | Schajer | G01B 21/20 33/552 |
| 2006/0050952 A1 * | 3/2006 | Blais et al. | 382/154 |
| 2006/0067579 A1 * | 3/2006 | Pirkl | G01B 11/24 382/190 |
| 2007/0214886 A1 * | 9/2007 | Sheynblat | G01P 15/18 73/509 |
| 2008/0065351 A1 * | 3/2008 | Panotopoulos et al. | 702/170 |
| 2009/0039157 A1 | 2/2009 | Reichenbach et al. | |

* cited by examiner

MEASUREMENT OF THE SURFACE SHAPE MAP OF FLAT AND CURVY OBJECTS, INDEPENDENT OF RELATIVE MOTIONS

TECHNICAL FIELD

This invention relates to a method and system that can measure the surface shape map of an object that is moving longitudinally relative to the apparatus, independent of relative motions in the measurement directions. Such measurements are useful for surface quality control of manufactured products, for example sawn lumber and logs, rolled metals and highway pavements.

BACKGROUND OF THE INVENTION

Surface shape measurement is an important need in many industrial and scientific applications. Typical examples include flatness inspection of road surfaces, quality control of manufactured products such as sawn lumber and rolled metal, and shape determination of complex shaped objects such as logs.

Figure 1A:
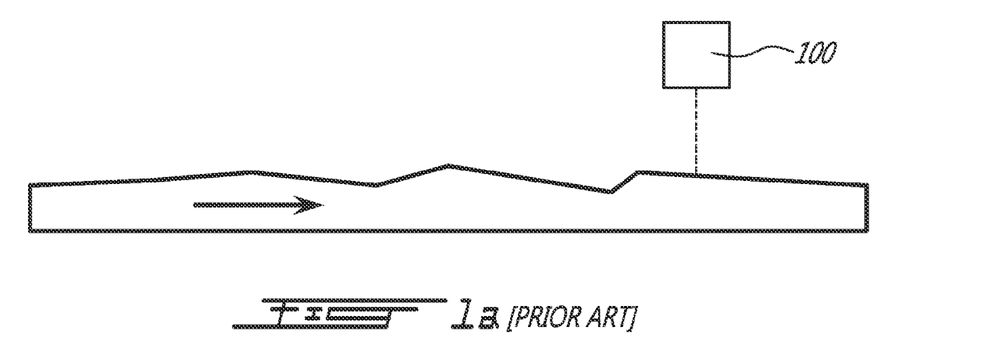

A simple way to measure surface shape profile is to make a series of measurements using a distance sensor while relatively moving the measured object and the sensor in a straight line perpendicular to the measurement direction. FIG. 1(a) schematically shows an example arrangement for a surface shape along a single line. The drawback to this method is that deviations from straight-line motion cause relative displacements in the measurement direction that are indistinguishable from measured surface shape. Thus, very accurate linear motion is essential.

In many cases, accurate linear motion is not practicable. For example, when measuring the surface profile of a highway pavement, it is generally not feasible to provide a separate linear slide for moving the sensor. Instead, the sensor must travel on the irregular pavement that it is measuring.

U.S. Pat. No. 5,280,719 describes an apparatus that uses a large number of equally spaced sensors. The apparatus seeks to identify long surface features by overlapping the sets of measurements made at successive intervals much less than the total spacing of the sensors. However, the large number of sensors that are required creates a large cost and maintenance burden. U.S. Pat. No. 4,573,131 describes a method of using just four sensors to achieve the same objective. The sensors make successive measurements at small intervals of travel. The described method is based on the assumption that successive sensors reaching the same point along the measured line have the same distance from the measured surface. This is typically not a reasonable assumption, and the described method has only limited effectiveness.

The above-mentioned patents disclose methods for measuring surface height profiles along individual lines on the target object. It is also of great practical interest to be able to measure a surface shape map, similar in concept to a topographic map. Such measurements can be achieved by replacing the individual distance sensors shown in FIG. 1 ("point sensors") by sensors that measure surface height profile at multiple points along lines ("line sensors"). The accumulation of sequential measurements at the various intervals along the measured lines creates a surface shape map. Line sensor measurements are subject to the same influence of deviations from straight-line motion of the measured object during the measurements as point sensors. Canadian Patent 2,297,879 describes a technique where multiple equally spaced parallel lines are measured, with the surface shape identified by overlapping the successive measurements. This approach is a development of that used in U.S. Pat. No. 5,280,719, with multiple line sensors replacing multiple point sensors. Both techniques have similar limitations. Their lengthwise spatial resolution is limited to the distance between the sensors; the use of evenly spaced parallel sensors makes the method unsuitable for achieving finer spatial resolution. When doing measurements using two line sensors, only surface twist can be identified, but not lengthwise shape.

None of the above techniques is well suited to making surface shape measurements with fine lengthwise spatial resolution. They are also not well suited to measuring the surfaces of objects with opposing sides. At best, they can measure each of the sides separately, but they do not provide accurate thickness information. The method described in U.S. Pat. No. 7,003,894 is successful at making fine resolution surface height profile measurements and providing accurate thickness information. The method involves the use of multiple sensors that make sequential surface height measurements. The surface height profile(s) is/are mathematically determined from the measured data by observing that the surface height information appears sequentially in the measured data, while the effects of relative motions occur simultaneously. U.S. Pat. No. 7,003,894 describes several different possible measurement configurations.

The methodology described in U.S. Pat. No. 7,003,894 works well when the number of surface points to be measured is relatively modest, for example, to determine surface shape profiles along one or a small number of chosen lines within the specimen surface. However, the computation becomes very burdensome and time consuming when an entire surface shape map is desired. The present invention provides a different data handling approach that is able to evaluate detailed surface height maps in real time, that is in an interval of time less than required for data acquisition. Furthermore, the method and system operate independent of relative motion, that is, they are independent of movements due to translation, pitch and/or roll that the object may experience when being mapped.

The various prior methods are difficult to apply to the measurement of surfaces that are not approximately normal to the measurement direction because they focus on relative motions of the measured object in that normal direction. Thus, the various techniques are not well suited to the measurement of the surface shape of non-flat objects such as logs. The present invention extends the scope of method described in U.S. Pat. No. 7,003,894 to enable effective surface shape measurements of such non-flat objects.

SUMMARY OF THE INVENTION

The present invention provides a method for measuring surface shape that overcomes the limitations of previous art. The invention involves using multiple sensors operating simultaneously. The main differences from previous designs are the way in which the sensors are geometrically arranged, and the way their measurements are combined to determine the desired surface shape map.

The central idea of the present invention is the observation that surface shape features appear in delayed sequence as the observed surface moves longitudinally relative to the sensor array. However, any relative motions in the measurement direction, either translational or rotational, appear simultaneously at all sensors. Efficient mathematical procedures are described to separate the delayed and simultaneous components of the measurements, from which the surface shape map is determined.

In accordance with one aspect of the present invention, there is provided a method for producing a surface shape map of at least one surface of an object and independent of relative motion of the object, the method comprising: (a) providing a plurality of distance sensors arranged to measure changes in surface height on the at least one surface of the object; (b) moving the object a distance relative to the plurality of sensors in a selected direction; (c) taking sensor readings with at least some of the plurality of sensors of the distance moved by the object in the selected direction at measured increments of relative movement of the object to the plurality of sensors, wherein the sensor readings include measured positions of similar points on the surface of the object from different sensors of the plurality of sensors, the measured position of the similar points producing a sequence of point measurements; (d) determining relative motions of the plurality of similar points by comparing the measured positions of similar points at different times; and (e) subtracting the relative motions of the plurality of similar points from sensor readings to obtain the surface shape map.

In accordance with another aspect of the present invention, there is provided the method described herein, wherein the surface shape map is produced in an interval of time less than that required for data acquisition.

In accordance with yet another aspect of the present invention, there is provided the method described herein, wherein the distance sensors are multi-point line sensors.

In accordance with still another aspect of the present invention, there is provided the method described herein, wherein the object and the surface shape map produced are generally flat and step (c) is taken with the plurality of distance sensors arranged to avoid sole equally spaced parallel lines directed at the object.

In accordance with yet still another aspect of the present invention, there is provided the method described herein, wherein the object is generally flat with opposing surfaces wherein the step (c) is taken with two sets of distance sensors, wherein each set of distance sensors is arranged to measure changes in surface height on the opposing surfaces of the object placed between the two sets of sensors, and with the plurality of distance sensors arranged to avoid sole equally spaced parallel lines directed at the object.

In accordance with a further aspect of the present invention, there is provided a method described herein, wherein the object is a substantially cylindrical object including significant surface slopes, wherein the step (c) is taken with at least four opposed sets of distance sensors, wherein the object placed between the sets of sensors that measure changes in surface height on at least two surfaces of the object, and with the plurality of distance sensors arranged to avoid sole equally spaced parallel lines directed at the object.

In accordance with yet a further aspect of the present invention, there is provided a method described herein, wherein the distance sensors are arranged around the measured object in a rectangular or triangular configuration.

In accordance with still a further aspect of the present invention, there is provided a method described herein, wherein distance measurements are made at known points on the measured object using sensors that can measure distances at multiple points within a surface area.

In accordance with yet still a further aspect of the present invention, there is provided a data processing system for producing a surface shape map of an object independent of the relative motion of the object, the system comprising: a plurality of distance sensors arranged to take sensor readings on the at least one surface of the object of measured positions of many pairs of substantially similar points measured by different sensors of the plurality of sensors at different times; means to provide a relative motion between the plurality of distance sensors and the object, and a motion sensor triggering simultaneous measurements from the plurality of distance sensors, wherein the system receives data from the plurality of distance sensors, compares the measured positions of many pairs of substantially similar surface points measured by different sensors at different times, uses the comparison to determine the relative motions of the similar surface points, and subtracts the determined relative motions from the sensor readings evaluates to obtain the surface shape map of the measured object independent of relative motions.

In accordance with one embodiment of the present invention, there is provided the data processing system described herein, wherein the surface shape map is produced in an interval of time less than that required for data acquisition.

In accordance with another embodiment of the present invention, there is provided the data processing system described herein, wherein regularization of the shape map is achieved to produce stabilization and/or smoothing.

In accordance with yet another embodiment of the present invention, there is provided the data processing described herein, wherein where the regularization type is Tikhonov regularization.

In accordance with still another aspect of the present invention, there is provided the data processing described herein, wherein the identification of pairs of substantially similar surface points includes consideration of the effects of relative motions between the sensors and object.

A typical configuration of the invention involves making measurements along lines in multiple directions relative to the measured object. Such an arrangement allows the measurement of surfaces that have significant slope relative to a measurement direction. The mathematical method used combines the measurements from the various sensors to form an overall map of the shape of the measured object. Since the number of measurements made typically exceeds the number of surface shape results to be determined, averaging of the measured data occurs within the mathematical calculation, thereby reducing the effects of measurement noise,

DESCRIPTION OF THE DRAWINGS

Reference will now be made to the accompanying drawings showing, by way of illustration a particular embodiment of the present invention and in which:

FIG. 1. Illustrates a surface profile measurement, (a) using a single sensor, (b) using multiple sensors [PRIOR ART];

FIG. 6. Illustrates a cross-sectional view of the sensor arrangement according to FIG. 5, illustrating the geometrical quantities associated with (a) a sensor array measuring vertically, and (b) a sensor array measuring horizontally.

DETAILED DESCRIPTION OF THE INVENTION

To simplify the description, it is supposed that the distance sensors remain stationary and that the measured object moves. However, it is apparent that the description also applies to the case of a stationary object and moving sensors.

Figure 1B:
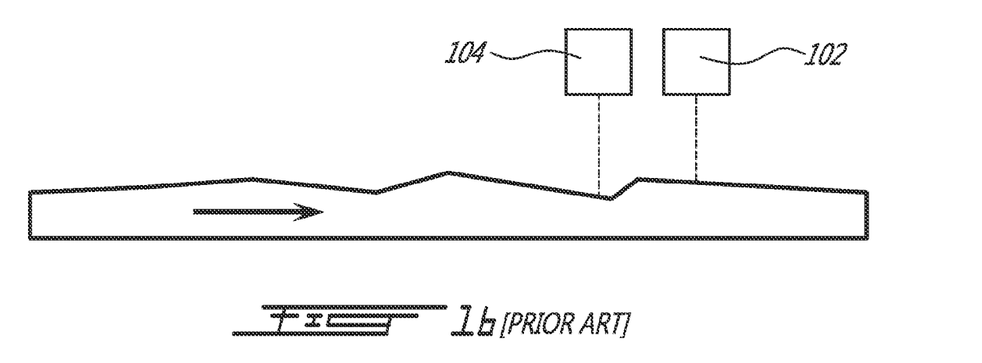

FIG. 1 represents the Prior Art where an object travels in a direction towards a sensor 100. In a further Prior Art embodiment, the object to be met travels towards two sequentially arranged sensors 104 and 102.

Figure 2:
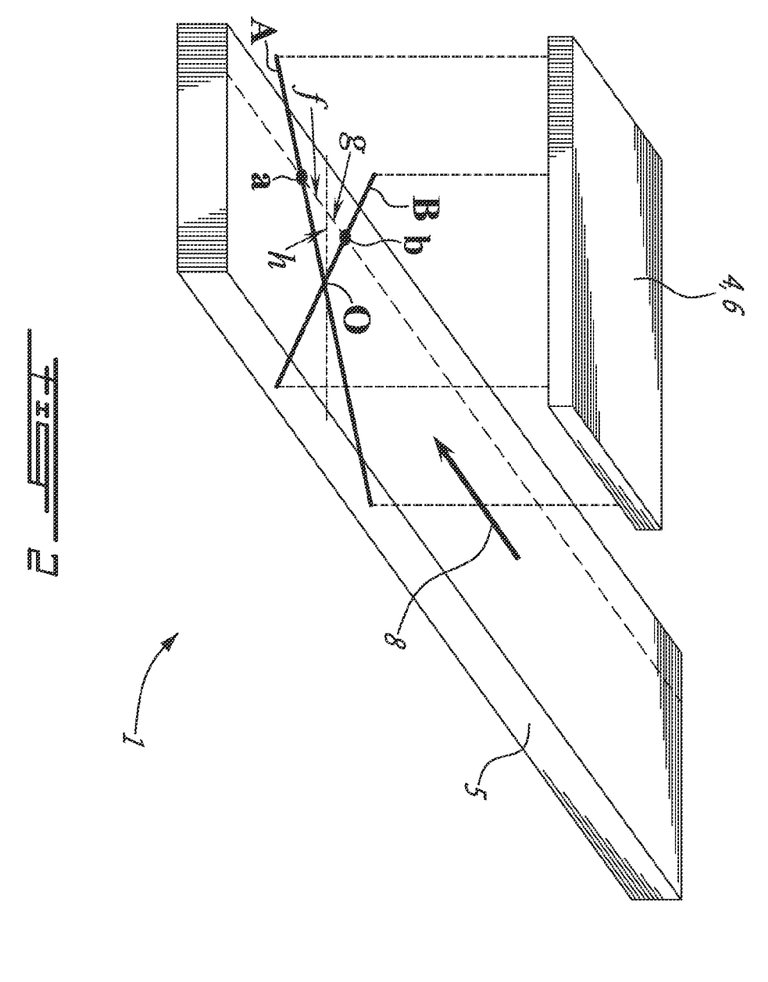
FIG. 2. Illustrates a sensor arrangement according to one embodiment of the present invention measuring a single generally flat surface.

FIG. 2 schematically shows a basic sensor arrangement system 1. In this case, two line-type distance sensors 6 are arranged to make measurements along non-parallel lines A, B. The intersection point O of these lines may lie on the measured object 5, as shown in the figure, or elsewhere. The distance sensors 4, 6 can be of any suitable type, chosen according to the needs of the particular application. These sensors 4, 6 should be capable of identifying the measured distances at known points along the lengths of the measured lines, which need not be straight. Any of a wide variety of sensors may be used, including single-point or multiple-point distance sensors.

The measured object 5 moves in a substantially longitudinal direction 8 relative to the sensor assembly 4, 6. FIG. 2 does not explicitly show any details of a mechanism for causing the required motion because such details can vary substantially according to the physical characteristics of the measured object 5. Various mechanisms can be suitable, and their detailed designs do not form part of the present invention. However, they should include a means for measuring the longitudinal motion of the moving object. Any accurate measuring means is acceptable; for example, an encoder type motion sensor (not illustrated). The motion sensor readings are used to trigger simultaneous measurements from the line sensors, at regular intervals $\Delta$ along the measured object.

For purposes of discussion, two example measurement points labeled a and b are selected from along the measured lines in FIG. 2. Point a lies within line A of sensor 4, and point b lies within line B of sensor 6. The two points lie parallel to the motion (direction 8) of the measured object, and thus traverse a generally common path along the measured object.

In practice, the motion of the measured object is not precisely in a longitudinal direction, and may also include transverse motion perpendicular to the measured surface ("translation"). Such translational motion causes all readings along both line sensors to increase or decrease simultaneously. Additionally, there may be a pitching motion, causing readings around point a to increase and readings around point b to decrease, or vice-versa. Yet additionally, there may be a rolling motion, causing readings around both a and b to increase and readings at the opposite side of intersection point O to decrease, or vice-versa.

As an example, consider the case of an object spanned by n measured points at regular spacing $\Delta$. Let $u_i$ be the heights of the measured points on the surface of the object along the longitudinal line containing points a and b. The index i lies within the range $1 \le i \le n$, starting at 1 when the leading edge of the measured object reaches intersection point O, and incrementing sequentially as the measured object moves longitudinally by successive distance increments $\Delta$ relative to the sensors. Let $y_i$ be the corresponding translation amount of the measured object at the times when it moves past intersection point O by successive incremental distances $\Delta$. Further, let $z_i$ be the corresponding pitch, and $r_i$ the corresponding roll of the measured object. It should be remembered that the present invention operates independently of these relative motion of the translation, pitch and roll.

The geometry in FIG. 2 creates an inversion of the measured surface data. An increase in surface height causes a decrease in distance sensor reading. To avoid possible confusion, it is convenient to define "height" quantities of the kind:

$$a_i = H - a^*_i \qquad (1)$$

where $a^*_i$ is the measured distance of the surface from sensor "a", H is a "reference" distance. The exact value chosen for H is not critical. For example, the average value of $a^*_i$ would be a reasonable choice. However, the values of H chosen for the other sensors cannot be chosen with similar freedom. They should be such that all measured "heights" would be equal for the case of a flat object moving parallel to the sensor array.

The readings measured at points a and b combine the contributions of local surface heights, translation, pitch and roll as follows $$a_i = u_{i-p} + y_i + fz_i + hr_i \qquad (2)$$

$$b_i = u_{i-q} + y_i + gz_i + hr_i \qquad (3)$$

where h is the transverse distance of points a and b from the intersection point of the line sensors, f and g are the corresponding longitudinal distances of a and b from the intersection point. For these distances, h is defined as being positive on the side of the measured object containing the example points a and b in FIG. 2. Distances f and g are defined as positive when upstream of intersection point O. Thus, in FIG. 2, distance f is a positive quantity and distance g is a negative quantity.

In FIG. 2, the surface height measured at point a lies a distance f upstream of intersection point O. This distance comprises approximately p steps of length $\Delta$, where p is the nearest integer solution of $p = f/\Delta$. Thus, measurement $a_i$ indicates surface height $u_{i-p}$ in addition to the translation, pitch and roll motions. Conversely, the surface height measured at point b lies a distance g upstream of intersection point O (a negative quantity in FIG. 2). This distance comprises approximately q steps of length $\Delta$, where q is the nearest integer solution of $q = g/\Delta$ (also a negative quantity in FIG. 2). Thus, measurement $b_i$ indicates surface height $u_{i-q}$ in addition to the translation, pitch and roll motions.

At points i+p and i+q equations (2) and (3) become $$a_{i+p} = u_i + y_{i+p} + fz_{i+p} + hr_{i+p} \qquad (4)$$

$$b_{i+q} = u_i + y_{i+q} + gz_{i+q} + hr_{i+q} \qquad (5)$$

Subtracting equation (5) from equation (4) to eliminate the quantity $u_i$ gives $$(a_{i+p} - b_{i+q}) = (y_{i+p} - y_{i+q}) + (fz_{i+p} - gz_{i+q}) + h(r_{i+p} - r_{i+q}) \qquad (6)$$

Equation (6) applies at all points in the range $1-q \le i \le n-p$. This set of equations can be written in matrix form as $$Gm = d \qquad (7)$$

where G is a matrix whose rows contain the coefficients from the right side of equation (6), d is a vector whose elements are the measured data from the left side of equation (6), and m is a vector containing the set of translation, pitch and roll quantities to be determined $$m = [y_1 \, z_1 \, r_1 \, y_2 \, z_2 \, r_2 \, y_3 \, z_3 \, r_3 \ldots y_n \, z_n \, r_n]^T \qquad (8)$$

The matrix G that is formed from the single pair of measurement points a and b has fewer rows than columns, and so is under-determined. However, the matrix can be substantially augmented using many additional rows from all other available pairs of corresponding measurement points along the two measurement lines shown in FIG. 2. The boundary conditions $$y_1 = y_n = z_{n/2} = 0 \tag{9}$$

can be enforced by including them as additional rows in matrix G. Other combinations of boundary conditions that similarly constrain the solution are also acceptable.

When all the various equations (6) and boundary conditions are assembled into matrix G, the resulting number of rows should greatly exceed the number of columns, thereby making the matrix over-determined. In this case, the resulting equation (7) can be solved in a least-squares sense by pre-multiplying by $G^T$ $$G^T G m = G^T d \tag{10}$$

Equation (10) involves the solution of 3n unknown quantities in vector m, and can be evaluated rapidly using modern computers. The surface shape map can then be determined by inverting equations (4) and (5) to give $$u_i = (a_{i+p} + b_{i+q} - y_{i+p} - f z_{i+p} g z_{i+q} - h r_{i+p} - h r_{i+q})/2 \tag{11}$$

where the interpretations of quantities u, a and b are now generalized to refer to the surface height profile along the longitudinal line traversed by any one given pair of measurement points along measurement lines A and B in FIG. 2. Exceptionally, for I<1−q $$u_i = a_{i+p} - y_{i+p} - f z_{i+p} - h r_{i+p} \tag{12}$$

and for i>n−p $$u_i = b_{i+q} - y_{i+q} - g z_{i-q} - h r_{i-q} \tag{13}$$

The assembly of the set of all the surface height values along all available longitudinal lines produces a surface shape map of the measured object, similar in character to a topographic map. The mathematical method described in equations (1) to (13) is designed to keep the required numerical processing to a moderate size such that the calculations can be done in "real time", i.e., within a time less than required for the data acquisition. This feature is achieved by arranging for the matrix solution in equation (10), which is the most time consuming part of the calculation, to involve only translation, pitch and roll quantities. Surface shape quantities are excluded because they are many times more numerous, particularly when the line sensors in FIG. 2 contain many finely spaced measurement points. In the described calculation method, the presence of more measurement points within the line sensors enhances computational accuracy by increasing data averaging. There is a proportionate increase in the time taken to formulate matrix $G^T G$, but the solution time of equation (10) remains unchanged.

An economy in computation time can sometimes be achieved if the relative motion of the measured object is such that one or more of the quantities y, z and r have relatively small influence. This could occur, for example, when some details of the mechanism producing the relative motions happen to constrain the measured object by differing amounts for the different types of relative motion. In particular, the pitch z can be less influential because the coefficients f and g in equation 11 have opposite signs, so the associated terms tend to cancel. Thus, it can sometimes happen that a satisfactory result can be achieved while excluding one or more of the relative motion quantities from equations (2)-(13).

The presence of only a few measurement points within the measured lines, or the occurrence of limited measurement accuracy, impair the stability of the calculation, and introduce noise into the solution. The use of line sensors arranged along parallel lines, especially when evenly spaced, also impairs computational stability because it impairs the numerical conditioning of matrix G, often to the point of singularity. The use of several parallel line sensors unevenly spaced could be effective, but entirely even spacing is always undesirable.

The adverse effects of these characteristics can be reduced by using "regularization", a mathematical process that introduces smoothing. Such regularization does not create any new data, and so attention to the number, quality and geometrical arrangement of the measurements is always the preferable first step. Regularization is then a useful tool to make further refinements.

Several regularization techniques are commonly used, among them truncation and filtering. A convenient technique is Tikhonov regularization. The procedure involves modifying matrix $G^T G$ in equation (13) to penalize extreme values in the solution. The penalty can be applied to the norm of the solution, thereby creating a "small" solution, or to the norm of the numerical first or second derivatives of the solution, respectively creating "flat" or "smooth" solutions. A simple form of Tikhonov regularization adds an extra term to equation (13)

$$(G^T G + \beta B) m = G^T d \tag{14}$$

where β is a weighting factor called the regularization parameter. Matrix B is the identity, first or second derivative operator, chosen according to whether a "small", "flat" or "smooth" model solution is desired. In general, a "smooth" model is a reasonable choice because it is the most responsive to measurement noise.

Mathematical methods exist for finding the optimal value of the regularization parameter β, for example, using the Morozov discrepancy principle. However, in most practical cases, it is sufficient to find a value of β by trial and error that reduces noise without distorting the solution through excessive smoothing.

The sensor arrangement in FIG. 2 can operate successfully with a wide range of placements of the measured lines. The lines could intersect within or outside the measured object, and they could be symmetrically or unsymmetrically arranged. Additional line sensors could be included, possibly sharing or not sharing a common intersection point. The data from such sensors enhance the stability of the measurement by contributing many further rows to matrix G in equation (7). The described mathematical method applies to all these possibilities. In general, greater mathematical solution stability is achieved when the measurement lines are symmetrically arranged and intersect near the centerline of the measured object. In addition, solution stability is improved when the measurement lines are aligned diagonally such that the sensor assembly spans around 10% of the length of the measured object. In general, the use of parallel line sensors is undesirable because it impairs the numerical conditioning of matrix G, often to the point of singularity. The use of several parallel line sensors unevenly spaced could be effective, but entirely even spacing is always undesirable.

Figure 3:
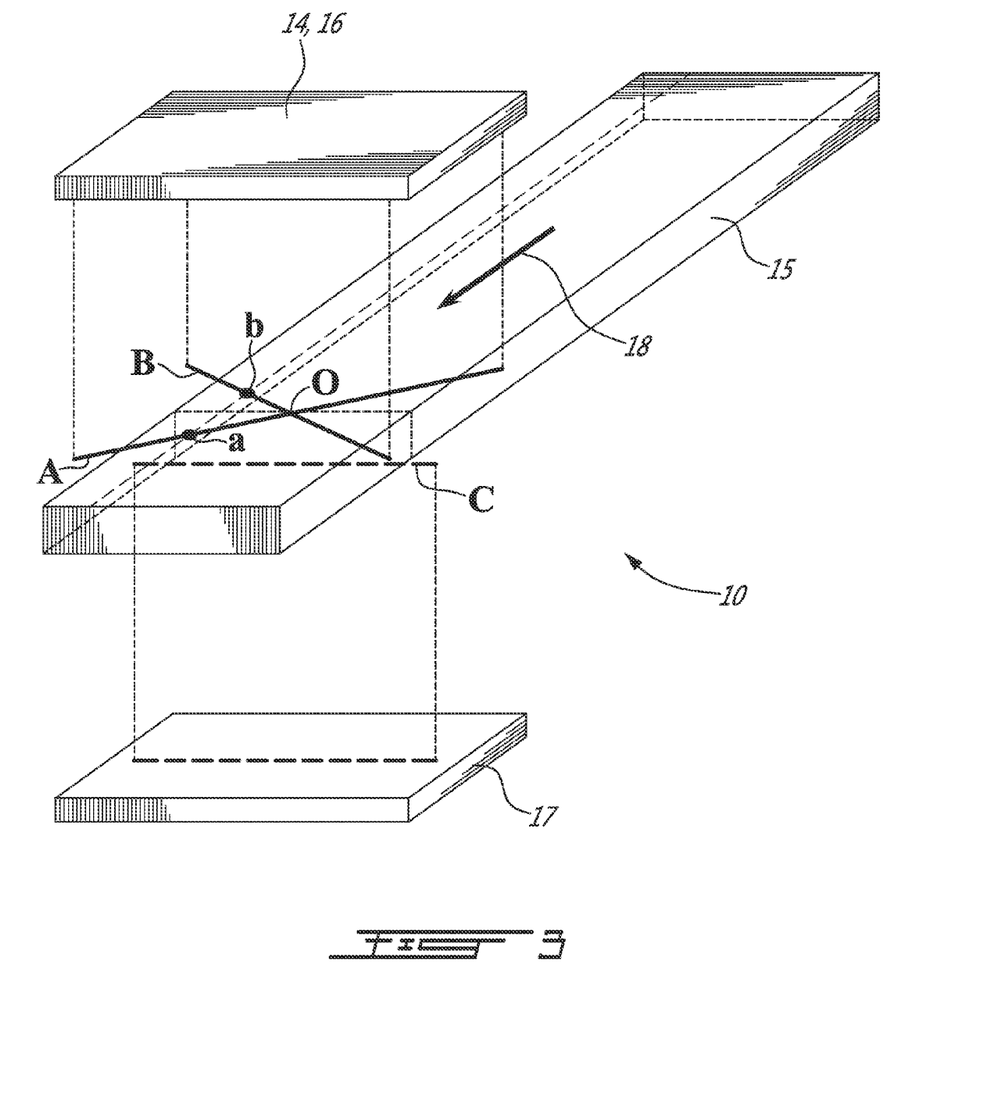
FIG. 3. Illustrates a sensor arrangement according to a further embodiment of the present invention using line sensors measuring opposing generally flat surfaces.

FIG. 3 shows a system 10 that is a variation of the previous sensor arrangement of FIG. 2, and is designed additionally to measure the surface shape map of an opposite surface on the measured object 15 moving in direction 18. This can be done using just a single additional line sensor 17 because the translation, pitch and roll of the measured object determined from lines A and B of sensors 14 and 16, similarly influence the measurements made using line C of sensor 17. There is, however, a change of sign corresponding to the reversal of the measurement direction. A convenient, but not essential choice for the position of line C of sensor 17 is perpendicular to the longitudinal direction 18, aligned with intersection point O. This particular choice eliminates the influence of pitch, allowing equation (2) to simplify to $$v_i = c_i - y_i - hr_i \qquad (14)$$

where v is a surface height on the second side and c is a typical reading from within line C of sensor 17.

The unsymmetrical arrangement of the line sensors in FIG. 3 provides measurements with different levels of accuracy on the two sides. In general, it may be expected that the accuracy of evaluation of the surface shape map on the side measured by lines A and B of sensors 14 and 16 will be superior to that on the side measured by line C of sensor 17. This is because each point in the height map of the first side derives from the average of two sensor readings rather than one. In addition, line C of sensor 17 does not add anything to the evaluation of the translation, pitch and roll of the measured object, it just uses the values determined from the opposite side.

Figure 4:
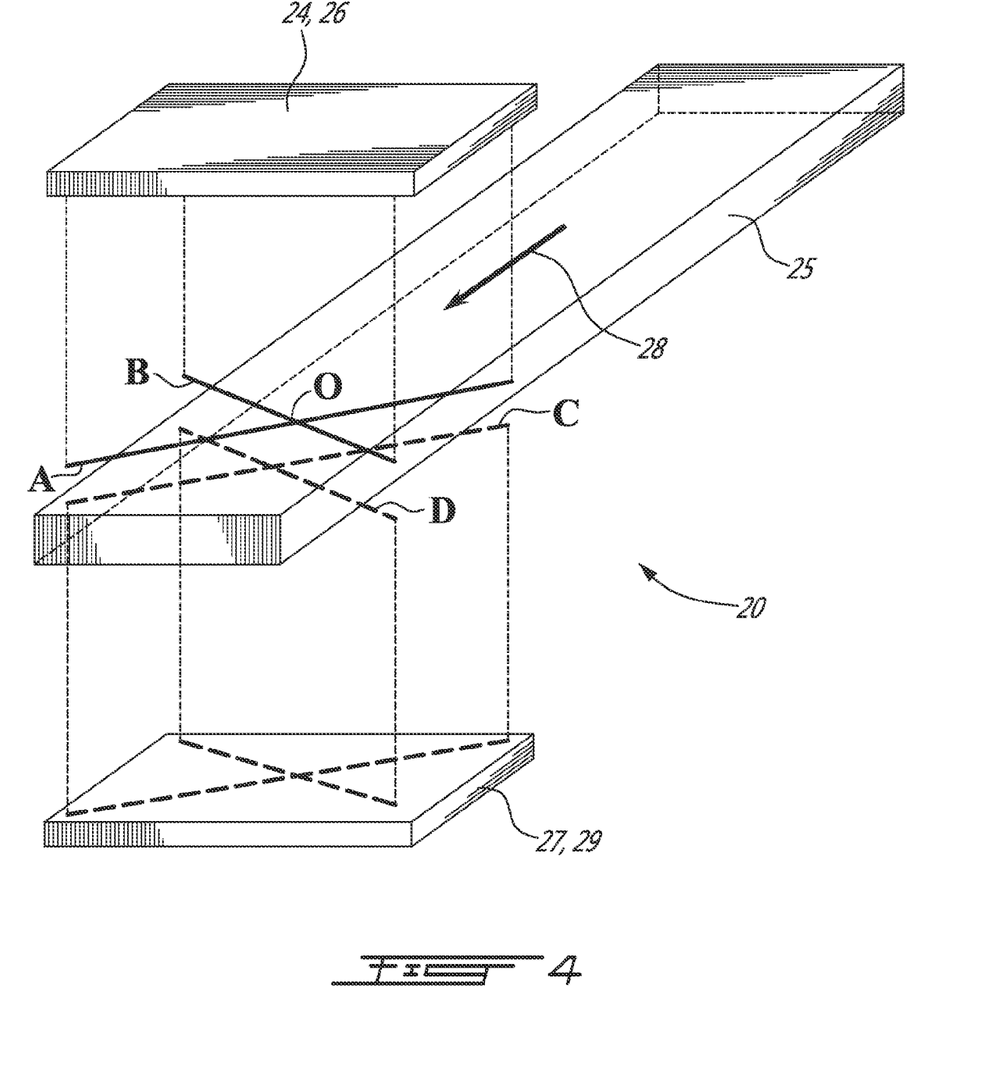
FIG. 4. Illustrates a sensor arrangement according to one embodiment of the present invention using symmetrically placed line sensors measuring generally flat opposing surfaces.

The non-uniform accuracy provided by the sensor arrangement in FIG. 3 can be adjusted by using the symmetrical arrangement and system 20 shown in FIG. 4. Here, a pair of line sensors 24, 26 and 27, 29 measures each side of the measured object 25 moving in direction 28. In this case, the measurements from both sides of the measured object can contribute to the evaluation of the translation, pitch and roll. The measurements from the second pair of line sensors add yet more rows to matrix G, thereby enhancing solution stability. However, there is no change in the number of columns, and thus the least squares matrix $G^T G$ remains the same size. The reversal in the measurement direction for the second side causes all equations used for this side to have the signs reversed for all terms containing y, z and r.

The sensor arrangements shown in FIG. 2, FIG. 3 and FIG. 4 are particularly suited to the measurement of fairly flat surfaces that are generally perpendicular to the measurement directions. Under these circumstances, small side-to-side motions of the measured object do not significantly influence the measurements, and need not be accounted for. However, for measured objects with large surface slopes, for example, a cylinder, side-to-side motion becomes influential and must be explicitly considered.

Figure 5:
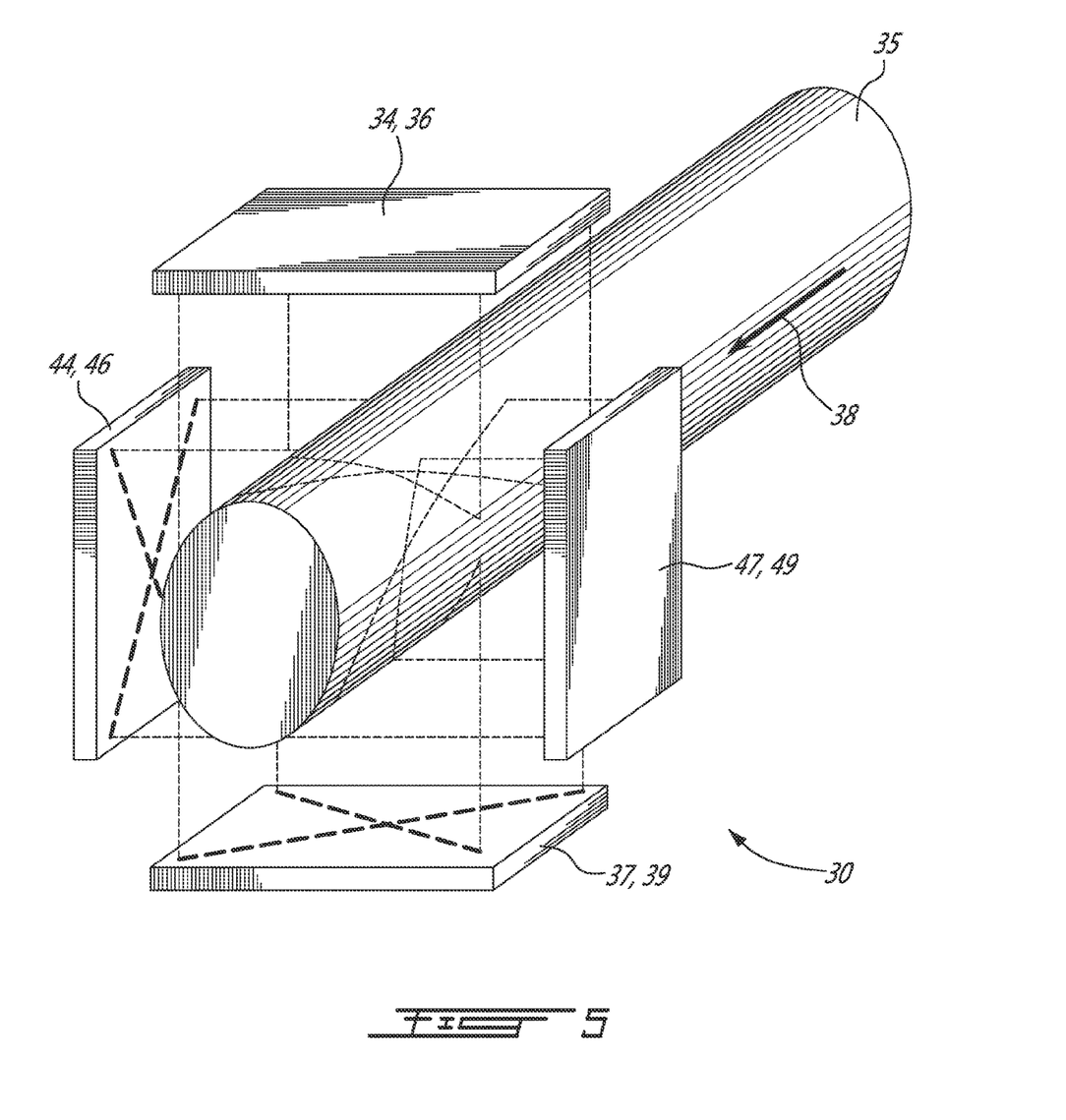
FIG. 5. Illustrates one embodiment of a sensor arrangement according to a further embodiment of the present invention measuring objects with large surface slopes.
Figure 6A:
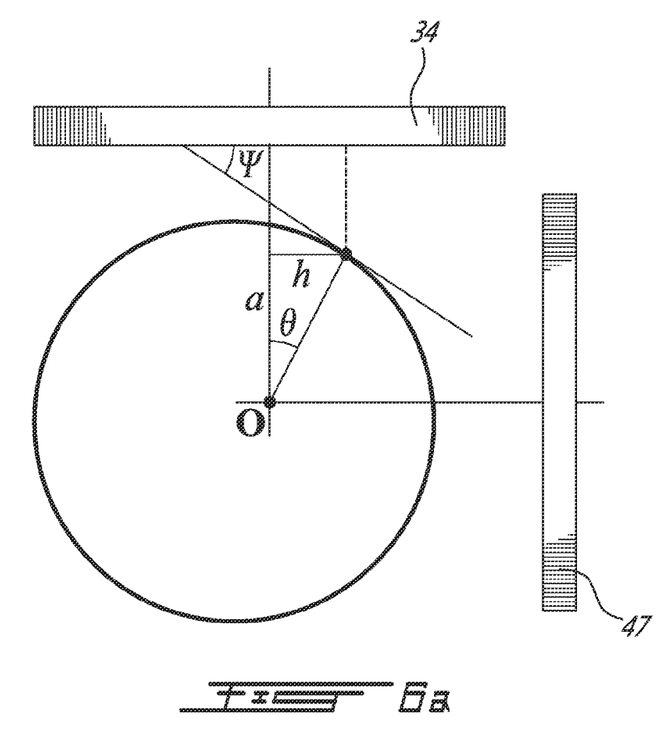

FIG. 5 shows an example sensor arrangement and system 30 suited to the measurement of the surface shape of an object 35 with large surface slope, in this case a cylinder. Additional line sensors 44, 46 and 47, 49 are included in the transverse plane to account for surface shape features and displacements in this direction, along with line sensors 34, 36 and 37, 39. FIG. 6(a) shows a cross-sectional view containing a typical measurement point a within one of the line sensors 34, 36 that make measurements in the vertical direction. Point O lies at the geometric center of the sensor arrangement, and forms the origin of a cylindrical coordinate system (R,θ) that defines the surface shape of the measured object. In this configuration, it is convenient, but not essential to define the reference distance H in equation (1) such that the reported height a would be zero if the measured surface were flat, horizontal and passing through point O. With this definition, the position of the surface point measured by sensor a is distance a above point O, and distance h to the right. The cylindrical coordinates of the surface point are $$R = \sqrt{h^2 + a^2} \quad \theta = \arctan(h/a) \qquad (15)$$

If the measured object were perfectly cylindrical and centered on O, the surface slope angle ψ at all possible measurement points a would equal the local coordinate angle θ. However, in the general case, these two angles are unequal. This angle can be determined from the local slope of the surface height profile measured along the line sensor. To give the slope within the cross-sectional plane shown in FIG. 6(a), the slope indicated from the line sensor must be divided by sin β, where β is the local inclination of the line sensor relative to the longitudinal direction. For computational stability, it is desirable to use a filter that smoothes the surface height data when determining the local slope, otherwise measurement noise will adversely influence the required numerical differentiation.

The surface height measured at point a combines the influences of the surface height of the measured object, u, its vertical translation, y, its vertical pitch, z, its roll around axis O, r, its horizontal translation, x, and its horizontal pitch, w. Equation (2) expands to $$a_i = u_{i-p} + y_i + fz_i + \frac{\sin(\psi - \theta)}{\cos\psi} Rr_i + \tan\psi x_i + f\tan\psi w_i \qquad (16)$$

Analogous expansions of equations (3)-(6) can similarly be constructed.

Figure 6B:
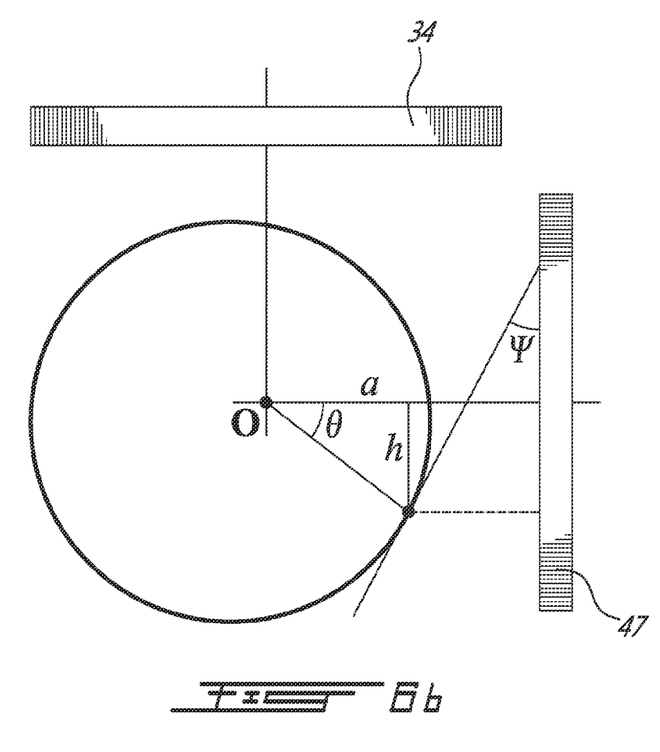

The geometrical quantities u, a, f, h, R, θ and ψ shown in FIG. 6(a) all refer to an individual measurement point a within a given measurement line. It is convenient to associate the definition of these quantities with the particular line sensor rather than the entire sensor assembly. This choice allows the associated equation (16) and subsequent equations to have a generally similar format for all sensor measurements, independent of orientation in space. For example, FIG. 6(b) shows the geometrical definitions associated with a measurement point a within a line sensor 47, 49 that makes measurements in a horizontal direction. The associated version of equation (16) is:

$$a_i = u_{i-p} + x_i + fw_i + \frac{\sin(\psi - \theta)}{\cos\psi} Rr_i - \tan\psi y_i - f\tan\psi z_i \qquad (17)$$

where it can be seen that the overall equation format is preserved. The 90-degree difference in line sensor orientation causes quantities y and z to be interchanged with x and w, with sign changes where needed. These latter quantities are defined relative to the entire sensor assembly, and not just to individual sensors. Similar equations apply to the measurements from the other line sensors shown in FIG. 5. For non-perpendicular line sensor orientations, for example, a triangular sensor array, equations (16) and (17) need to be written in terms of vector components of the displacement quantities.

The equations analogous to equation (6) that derive from equations (16) and (17) can be assembled to form a matrix G with 5n columns and numerous rows. The displacement quantities obtained by solving equation (14) can then be subtracted from the raw measurements, analogous to the use of equations (11)-(13), to give the true surface shape map of the measured object.

The formulation of equations (16) and (17) is based on the assumption that the displacement quantities are small compared with the measurement spacing within the line sensors. When displacement quantities are relatively large, point b in FIG. 2, and analogously in subsequent figures, no longer shares the longitudinal path of point a. Instead, a point within the line sensor nearby to b shares that path. The discrepancy becomes a concern when large surface slopes ψ are present. The issue can be handled by doing a first calculation assuming that all points a and b share their longitudinal paths, i.e., as described above. Then the points b can be chosen to be at the line sensor locations that give shared longitudinal paths after accounting for the motions of the measured object. The calculation can be repeated until convergence is obtained. Typically, very few iterations are required.

Figure 7:
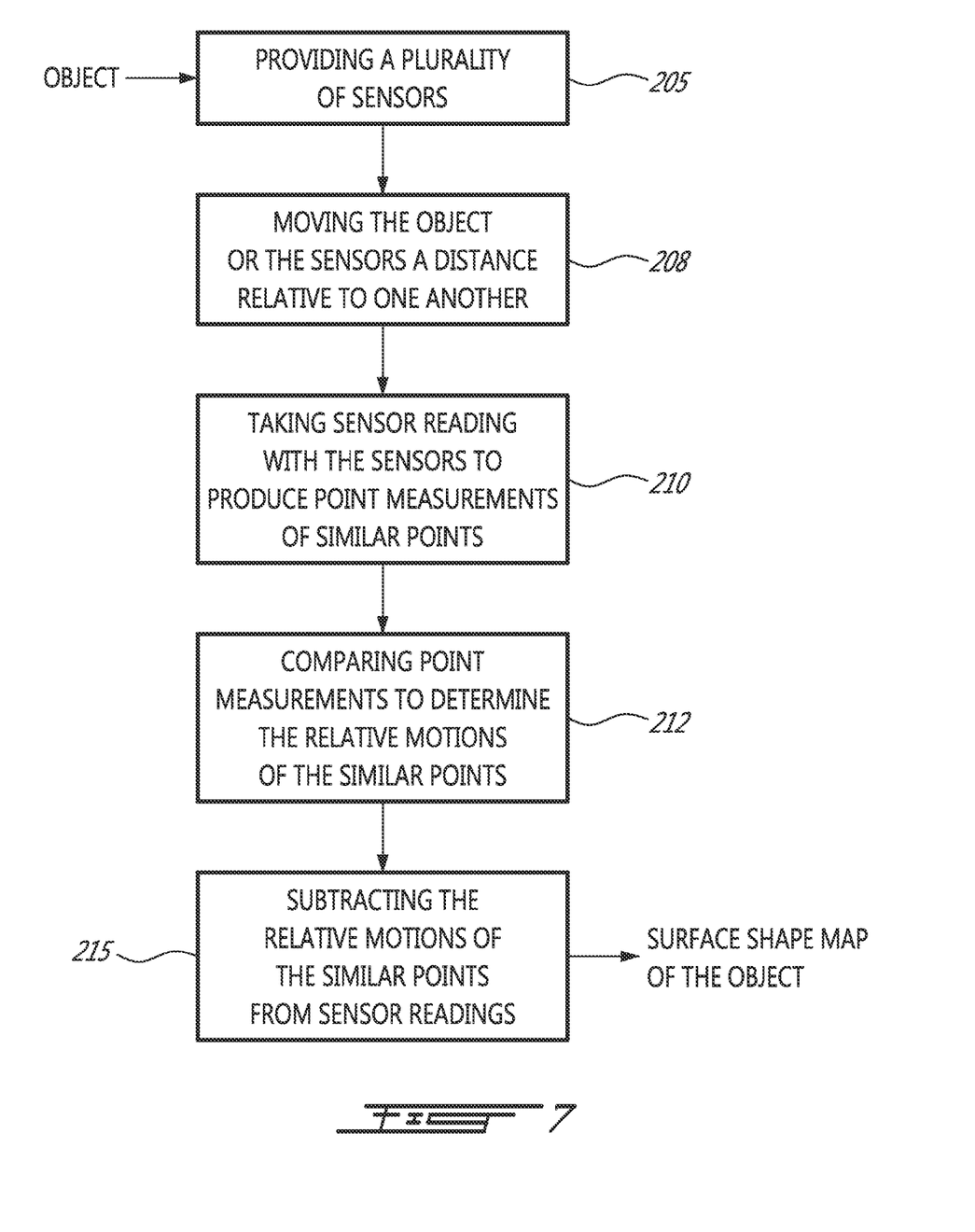
FIG. 7 illustrates a block diagram of the method of producing a surface shape map according to one embodiment of the present invention.

FIG. 7 illustrates a block diagram of the method of producing a surface shape map. The steps include 205, providing a plurality of sensors; 208 moving the object (or the sensors) relative to one another; 210 taking sensor readings with the sensors to produce point measurements of similar points; 212 comparing point measurements to determine the relative motion of the similar points; and 215 subtracting the relative motions of the similar points from the sensor reading to produce the surface shape map.

It is apparent that the ideas that constitute this invention can be applied to meet a wide range of measurement needs. The present disclosure describes the basic principles of the invention, and gives many practical details. Many possible variants of the example sensor arrangements can give successful results. They may have fewer or more than two line sensors per measured surface, these line sensors may or may not all be intersecting, they may have parallel or fan beams, line sensors need not be straight lines, nor need they be continuous, i.e., to allow space for an intersecting line sensor. It is not even essential that the measurements be made specifically along lines, only that pairs of corresponding measured points a and b can be identified. It is evident that a person skilled in the art could use the principles disclosed here to construct a surface shape map measurement system that varies in some details from the particular examples described herein. It is also evident that such a person could also employ mathematical methods different from the examples presented here to achieve the same or similar numerical results. All such variations lie within the scope of this invention.

The invention claimed is:

1. A method for producing a surface shape map of at least one surface of an object and independent of relative motion of the object, the method comprising:
   (a) arranging at least four opposed sets of distance sensors to measure changes in surface height on at least two surfaces of the object, the sets of distance sensors positioned to avoid sole equally spaced parallel lines directed at the object;
   (b) moving the object or the sets of distance sensors a distance relative to -one another in a selected direction;
   (c) taking sensor readings of the distance moved by the object in the selected direction at measured increments of relative movement of the object to the sets of distance sensors, wherein the sensor readings include measured positions of a plurality of points on the surface of the object from different sensors of the sets of distance sensors, the measured positions of the plurality of the points on the surface of the object producing point measurements that comprise surface shape quantities and relative motion, wherein the relative motion is translation, pitch, roll and combinations thereof;
   (d) comparing the point measurements of the plurality of points on the surface of the object at different times by excluding the surface shape quantities from relative motion for the plurality of points on the surface of the object, so that only the relative motion of translation, pitch and roll of the plurality of points on the surface of the object are involved in the comparison, thereby determining the relative motions of the plurality of points on the surface of the object; and
   (e) subtracting the relative motions of the plurality of points on the surface of the object from sensor readings to obtain the surface shape map;
   wherein the distance sensors are multi-point line sensors and
   wherein the object is a cylindrical object including surface slopes.

2. The method of claim 1, wherein the surface shape map is produced in an interval of time, less than that required for data acquisition.

3. A method according to claim 1, wherein the distance sensors are arranged around the measured object in a rectangular or triangular configuration.

4. A method according to claim 1, wherein distance measurements are made at known points on the measured object using sensors that can measure distances at multiple points within a surface area.

5. A data processing system for producing a surface shape map of an object independent of the relative motion of the object, the system comprising:
   at least four opposed sets of distance sensors arranged to take sensor readings on the at least two surfaces of the object of measured positions of many pairs of points on the surface of the object measured by different sensors of the sets of distance sensors at different times and positioned to avoid sole equally spaced parallel lines directed at the object;
   means to provide a relative motion between the sets of distance sensors and the object; and
   a motion sensor triggering simultaneous measurements from the sets of distance sensors;
   wherein the measured positions of the many pairs of points on the surface of the object comprise surface shape quantities and the relative motion, wherein the relative motion is translation, pitch, roll or combinations thereof;
   wherein the system receives data from the plurality of distance sensors, compares the measured positions of the many pairs of points on the surface of the object measured by the different sensors at the different times, excludes the surface shape quantities from the relative motions for the measured positions of the many pairs of points on the surface of the object so that only the measured positions of the many pairs of points on the surface of the object are compared, and thereby obtain the surface shape map of the measured object independent of relative motions,
   wherein the distance sensors are multi-point line sensors, and
   wherein the object is a cylindrical object including surface slopes.

6. The data processing system of claim 5, wherein the surface shape map is produced in an amount of time, less than required for data acquisition.

7. The data processing system according to claim 5, wherein regularization of the shape map is achieved to produce stabilization and/or smoothing.

8. The data processing system of claim 7, wherein where the regularization type is Tikhonov regularization.

9. The data processing system of claim 5, wherein the identification of pairs of substantially similar surface points includes consideration of the effects of relative motions between the sensors and object.

10. A method according to claim 1 wherein the cylindrical object is a log.

11. The data processing system according to claim 5 wherein the cylindrical object is a log.

\* \* \* \* \*